United States Patent [19]

Kinzel

[11] 4,412,595
[45] Nov. 1, 1983

[54] THREE WHEELED VEHICLE

[76] Inventor: Augustus B. Kinzel, 1738 Castellana Rd., La Jolla, Calif. 92037

[21] Appl. No.: 253,076

[22] Filed: Apr. 10, 1981

[51] Int. Cl.³ .............................................. B60R 21/10
[52] U.S. Cl. ....................................... 180/211; 280/62;
280/756; 296/65 A; 296/102; 296/190; 297/216; 297/277
[58] Field of Search ................................ 180/210–217, 180/209; 188/2 R; 280/62, 263, 271, 272, 289 G, 688, 690, 697, 756; 296/21, 63, 102, 190, 65 R, 65 A; 297/216, 217, DIG. 2, 277, 195

[56] References Cited

U.S. PATENT DOCUMENTS

| 627,314 | 6/1899 | Veon | 280/272 |
|---|---|---|---|
| 1,473,956 | 11/1923 | Eyre et al. | 280/289 A |
| 1,994,504 | 3/1935 | Cox | 188/2 R |
| 2,133,747 | 10/1938 | Hunter | 297/299 |
| 2,167,096 | 7/1939 | Van Den Stock | 280/787 |
| 2,681,823 | 6/1954 | Gaisman | 296/63 |
| 2,911,232 | 11/1959 | Hastings, Jr. et al. | 280/756 |
| 2,921,799 | 1/1960 | Hatten | 280/756 |
| 3,099,326 | 7/1963 | Weigel et al. | 280/272 |
| 3,244,251 | 4/1966 | Duncan | 280/756 |
| 3,314,720 | 4/1967 | Millington et al. | 297/216 |
| 3,561,785 | 2/1971 | Kidder | 280/756 |
| 3,610,358 | 10/1971 | Korff | 180/209 |
| 3,690,720 | 9/1972 | Whisler | 296/190 |
| 3,986,748 | 10/1976 | Magnuson | 296/65 R |
| 4,022,488 | 5/1977 | Likas | 280/289 A |
| 4,088,367 | 5/1978 | Atkinson et al. | 297/DIG. 2 |

Primary Examiner—David M. Mitchell
Assistant Examiner—Pierre Huggins
Attorney, Agent, or Firm—Connolly and Hutz

[57] ABSTRACT

A power operated vehicle includes a body which is preferably mounted to three wheels and which includes a vertical transverse roll bar extending from one side of the body to the other with a longitudinal roll bar extending vertically from the back of the body to the transverse roll bar and with a seat spring mounted from the roll bars.

11 Claims, 3 Drawing Figures

THREE WHEELED VEHICLE

BACKGROUND OF INVENTION

Because of the energy crisis there is a great need for a light, low cost, low gas using vehicle. One attempt for solving this need has been in the Moped. A Moped, however, has certain disadvantages which have limited its acceptance. For example, an ideal vehicle to satisfy such needs should require no particular skill other than ordinarily used for driving automobiles. Additional requirements generally not met by a Moped are ease and comfort of the user when stationary, ability to achieve high speeds, weather protection, ability to carry additional payload (such as packages, children, etc.) in addition to the driver, a comfortable seat and light enough to be moved by hand. It is also preferable that the selling price of such an ideal vehicle should not be excessive and, for example, should be no more than twice that of a good Moped. Other desirable factors are related to safety since this is the main disadvantage of a Moped. Such considerations for a desirable vehicle would include a limited turning radius to avoid overturning on curves yet permit a very sharp turning radius for parking and moving by hand. Additionally the vehicle should not somersault when the front wheel hits a pothole or tend to somersault no matter how the brakes are applied. If the vehicle should overturn or somersault, the driver should be protected from direct impact with the roadway.

SUMMARY OF INVENTION

An object of the invention is to provide such a vehicle which overcomes the disadvantages of a conventional Moped.

In accordance with this invention, the vehicle is preferably a three wheeled vehicle with the driven wheel being in the front and the other two wheels being in the rear. A transverse vertical roll bar is secured to the vehicle body perpendicular to the longitudinal axis of the vehicle and located forward of and parallel to its rear axle. A longitudinal roll bar is also secured to the vehicle along its longitudinal axis from the back of the body up to and beyond the transverse roll bar. A seat is spring mounted to the roll bars.

In a preferred form of this invention an umbrella-like frame is secured to the roll bars and is covered to protect the user. The top of the cover may be opaque and the remaining portions transparent.

In accordance with one aspect of this invention, the steering mechanism of the vehicle is provided with disengageable means which limit its turning radius under ordinary operating conditions but upon disengagement thereof permit an extended turning radius to facilitate parking or manual moving of the vehicle.

THE DRAWINGS

DETAILED DESCRIPTION

Figure 1:
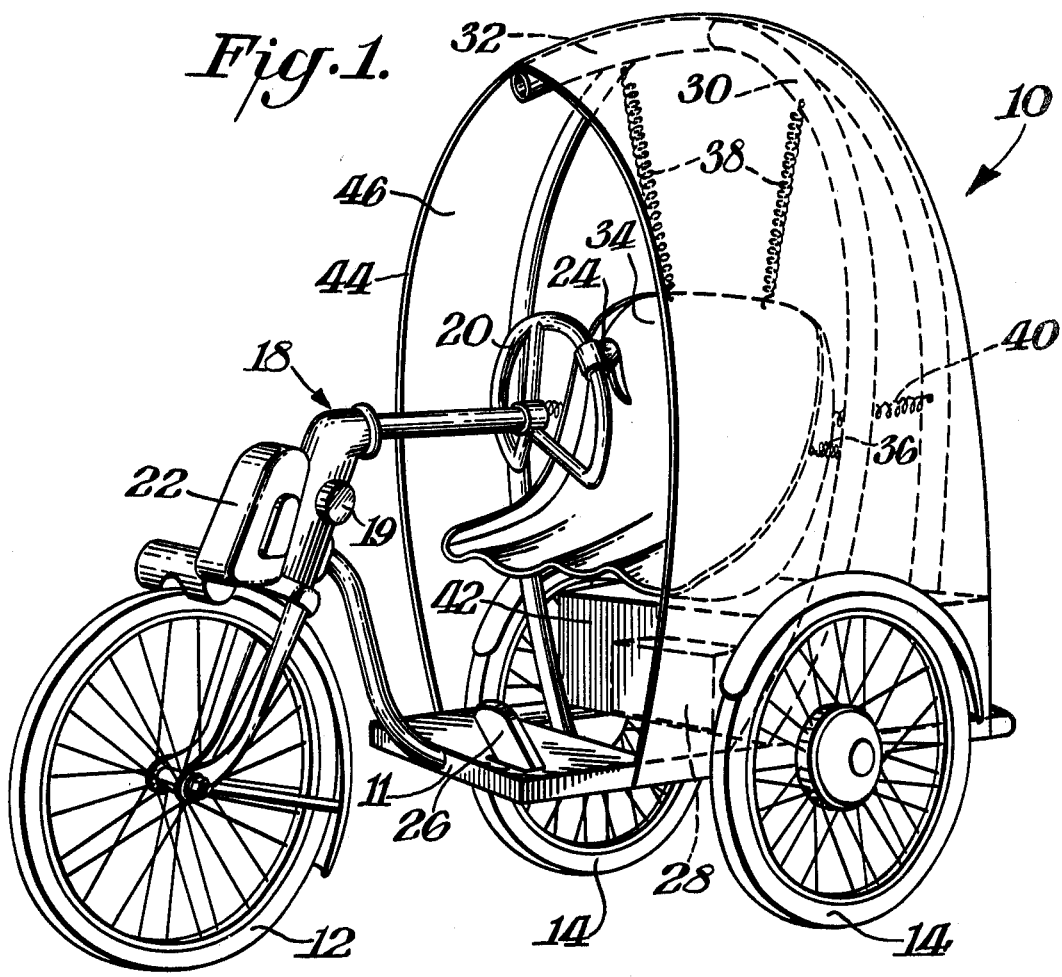
FIG. 1 is a perspective view of a vehicle in accordance with this invention.
Figure 3:
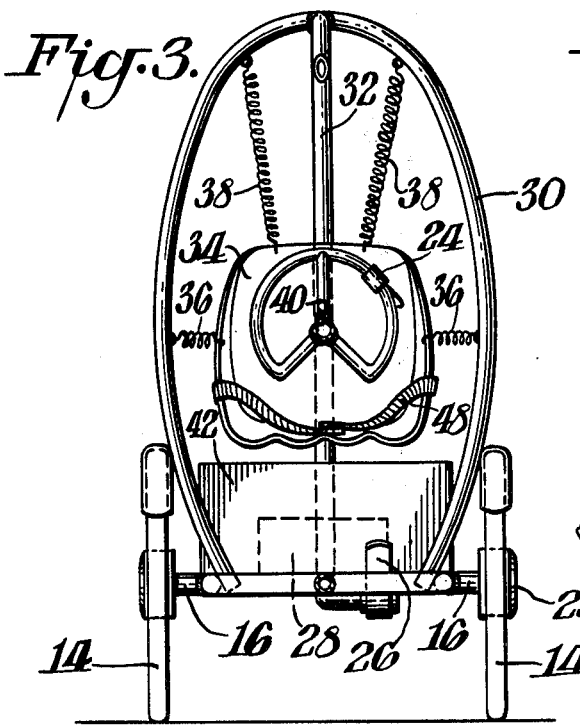
FIG. 3 is a front elevation view of the portion of the vehicle shown in FIG. 2.
Figure 2:
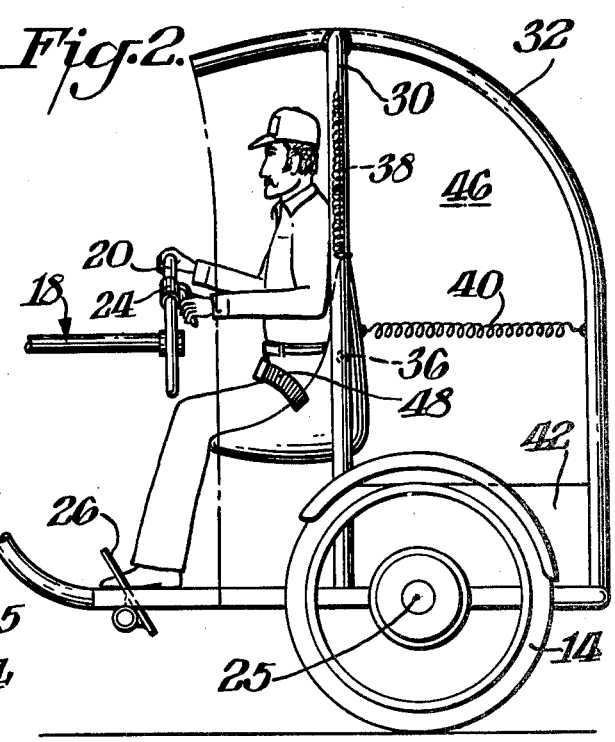
FIG. 2 is a side elevation view of a portion of the vehicle shown in FIG. 1.

FIGS. 1-3 illustrate a vehicle 10 in accordance with this invention. As indicated therein the vehicle includes a front wheel 12 and a pair of rear wheels 14, 14 mounted to an axle 16 secured to the tubing used in making the platform-like vehicle body 11. A steering mechanism 18 is associated with front wheel 12 and includes a steering wheel 20. A motor drive assembly 22 is provided for vehicle 10 as well as a motor control 24 on steering wheel 20. The provision of a driving motor for front wheel 12 in the manner illustrated eliminates the need for differentials and the like and permits a bicycle type construction.

Vehicle 10 preferably includes brakes 25 at the rear wheels only with the brakes being sufficiently large for that purpose and preferably activated by foot pedal 26. Rear wheels 14, 14 are otherwise free wheeling.

The power mechanism for vehicle 10 can be designed in various ways depending on the cost, performance and efficiency desired. A form of power mechanism which should provide simple positive control comprises an electric motor in the hub of the front wheel, suitably planetary geared. Electric power would be supplied, for example, by a hybrid unit, namely, a two cycle 50 cc gasoline engine driving an alternator or a generator. If an alternator is used, it could be voltage amperage varied for controlling the motor. If a generator is used, it would feed a small battery (such as indicated by phantom by the reference numeral 28 in FIG. 1) and the current would pass through a voltage amperage regulator to the motor. A small battery could be used with the alternator if desired. An alternative power mechanism system would be to have the engine mounted on the front wheel fork and then roller driving the front tire.

In accordance with this invention vehicle 10 includes roll bars which may be made, for example, of heat treated 4130 steel tubing or the like. One such roll bar is a transverse roll bar 30 which extends perpendicular to the longitudinal axis of the vehicle body in a plane parallel to rear axle 16 and approximately normal to the ground but disposed forward or rear axle 16. Roll bar 30 may be generally circular or may be generally eliptical as illustrated. The location of roll bar 30 forward of rear axle 16 provides a suitable location of the center of gravity.

Vehicle 10 also includes a longitudinal vertical roll bar 32 which extends upwardly from the back of the vehicle body along its longitudinal axis and is secured to the transverse roll bar 30. Longitudinal roll bar 32 is preferably only a partial roll bar so as not to obstruct vision of the vehicle user.

As illustrated, a seat 34 is spring mounted from the roll bars and is held at the vertical center line of roll bar 30 as low as practical for comfort. The spring mounting is preferably accomplished by a pair of side springs 36, 36 extending horizontally from seat 34 to roll bar 30 and by at least one top spring 38 extending from the top of seat 34 upwardly to roll bar 30 with a back spring 40 secured between the back of seat 34 and roll bar 32.

Vehicle 10 also preferably includes a container 42 which may take any suitable form in accordance with its desired function. Thus container 42 may be a solid container having a lockable cover or may be of open construction such as from wire or other suitable material. Container 42 is preferably secured to the roll bars and mounted directly on the rear axle 16 sufficiently beyond the rear wheels and located high enough so that if struck from the rear, a certain bumper or shock absorbing effect would be produced, and if back somersaulting is produced, the driver is protected. Container 42 thus performs a safety function in addition to providing a convenient utility box or other storage compartment.

In a preferred form of this invention, a light umbrella-like frame 44 is secured to the vehicle body and is covered with a shielding material 46. The top of the shielding material may be opaque to shield the driver from the sun while the remaining portion of shielding material 46 is preferably transparent to permit unobstructed vision while still shielding the driver from wind and weather. A plastic material could preferably be used which is tinted at the top portion and clear plastic in the remaining portion.

In accordance with a further feature of this invention, steering mechanism 18 includes disengageable means 19 for limiting the turning angle under ordinary driving conditions but providing for an increased turning angle under certain conditions such as during parking or manual movement of the vehicle. Any suitable means may be utilized to accomplish these results. For example, spring held pins or the like can be utilized which prevent a full turning of the steering wheel, and the pins can be detached to the special conditions noted above.

As illustrated in the drawings, seat 34 is a bucket seat and is provided with straps 48 for securing the users therein. Seat 34 may be of a single bucket type where only the driver would use vehicle 10 or as illustrated seat 34 may be a double bucket seat so as to accommodate a passenger as well as a driver.

The provision of the roll bars enhances the safety aspects of vehicle 10 and additionally provides a means from which the seat may be suspended. It is to be understood that other features may be included in vehicle 10 such as generally included in conventional Mopeds relating to starting the engine, the controls, the gasoline tank, lights, turning signals, etc. Accordingly the description herein is intended to provide teachings by which the invention may be practiced, but the description herein does not include conventional details which would be readily known to those skilled in the art for effectuating all of these teachings.

What is claimed is:

1. In a motor powered vehicle having a body with a plurality of wheels mounted to said body and with power driving means associated with at least one of the wheels for imparting motion to the vehicle and with a steering mechanism associated with the wheels for steering the vehicle and with a seat disposed in back of the steering mechanism, the improvement being a vertical transverse roll bar extending from one side of said body to the other perpendicular to the longitudinal axis of said body forward of and parallel to its rear axle, a vertical longitudinal roll bar extending from the back of said body and secured to said transverse roll bar midway thereof and perpendicular to said transverse roll bar, said seat being suspended from said roll bars in the plane of said transverse roll bar by spring means, said spring means including a back spring secured to the back of said seat and secured to said longitudinal roll bar rearward of said seat.

2. The vehicle of claim 1 wherein said wheels include a front wheel mounted along said longitudinal axis of said body and a pair of rear wheels mounted to said rear axle perpendicular to said longitudinal axis of said body, said power driving means being operatively connected to said front wheel, and said steering mechanism being operatively connected to said front wheel.

3. The vehicle of claim 1 wherein said wheels include a pair of rear wheels mounted to said rear axle, and brake means associated with said rear wheels and said rear wheels otherwise being free wheeling, and a foot pedal being secured to said body forward of said seat for actuating said brake means.

4. The vehicle of claim 1 including disengageable means for limiting the turning angle of said vehicle under ordinary operating conditions and permitting an expanded turning angle under selected conditions.

5. The vehicle of claim 1 including a frame mounted to said body and shielding material for protecting the user supported by said frame and said roll bars, said material including an opaque top portion and transparent side portions.

6. The vehicle of claim 1 wherein said seat is a bucket seat.

7. The vehicle of claim 7 wherein said bucket seat is a double bucket seat for holding the driver and a passenger.

8. The vehicle of claim 7 including strap means secured to said seat.

9. In a motor powered vehicle having a body with a plurality of wheels mounted to said body and with power driving means associated with at least one of the wheels for imparting motion to the vehicle and with a steering mechanism associated with the wheels for steering the vehicle and with a seat disposed in back of the steering mechanism, the improvement being a vertical transverse roll bar extending from one side of said body to the other perpendicular to the longitudinal axis of said body forward of and parallel to its rear axle, a vertical longitudinal roll bar extending from the back of said body and secured to said transverse roll bar midway thereof and perpendicular to said transverse roll bar, said seat being suspended from said roll bars in the plane of said transverse roll bar by spring means, and a container connected to said roll bars and mounted on said rear axle.

10. In a motor powered vehicle having a body with a plurality of wheels mounted to said body and with power driving means associated with at least one of the wheels for imparting motion to the vehicle and with a steering mechanism associated with the wheels for steering the vehicle and with a seat disposed in back of the steering mechanism, the improvement being a vertical transverse roll bar extending from one side of said body to the other perpendicular to the longitudinal axis of said body forward of and parallel to its rear axle, a vertical longitudinal roll bar extending from the back of said body and secured to said transverse roll bar midway thereof and perpendicular to said transverse roll bar, said seat being suspended from said roll bars in the plane of said transverse roll bar by spring means, said spring means comprising a side spring secured to each side of said seat and connected to said transverse roll bar, at least one top spring secured to the top of said seat and secured to said transverse roll bar in the general location of the area of securement of said longitudinal roll bar to said transverse roll bar, and a back spring secured to the back of said seat and secured to said longitudinal roll bar.

11. In a motor powered vehicle having a steering mechanism for steering the vehicle and with a seat to be disposed in back of the steering mechanism, the improvement being mounting means for resiliently suspending said seat, said mounting means comprising an upwardly extending side mounting member located on each side of said seat in a common vertical plane, a rear mounting member disposed in back of said seat approximately midway between said side mounting members, and spring means connecting said seat to each of said mounting members to thereby mount said seat to said vehicle body in a suspended manner.

* * * * *